United States Patent [19]

Dietrich, III

[11] 4,317,556
[45] Mar. 2, 1982

[54] TURBINE SKID BASE

[76] Inventor: Arthur G. Dietrich, III, 7532 N. Mohawk Rd., Milwaukee, Wis. 53217

[21] Appl. No.: 79,399

[22] Filed: Sep. 27, 1979

[51] Int. Cl.³ .............................................. F16M 13/00
[52] U.S. Cl. .................................... 248/602; 248/605; 248/615; 248/639; 248/678
[58] Field of Search ............... 248/346, 605, 615, 632, 248/634, 639

[56] References Cited

U.S. PATENT DOCUMENTS

| | | | |
|---|---|---|---|
| 1,272,866 | 7/1918 | Shorb | 248/639 |
| 1,805,674 | 5/1931 | Ramsperger | 248/632 |
| 1,810,506 | 6/1931 | Turner | 248/639 |
| 1,886,035 | 11/1932 | Mann | 248/639 |
| 2,014,466 | 9/1935 | Cheyney | 248/632 |
| 2,259,214 | 10/1941 | Rosenzweig | 248/632 |

FOREIGN PATENT DOCUMENTS

643075  9/1950  United Kingdom ............... 248/605

OTHER PUBLICATIONS

Winged Power, a brochure published by The Continental Automobile Co., Detroit, Mich.

*Primary Examiner*—William H. Schultz
*Attorney, Agent, or Firm*—Wheeler, House, Fuller & Hohenfeldt

[57] ABSTRACT

A light weight chassis or skid for a turbine or engine-generator combination has a relatively narrow central beam section with laterally extending wing portions which are provided with mounting pads for the engine and the generator. The chassis is supported on a supporting surface by three resilient motor mounts, two of which are connected to wing portions and the third is positioned under the center line of the beam portion and under the engine. The three mounts enable securing the chassis to irregular surfaces without twisting the chassis and affecting alignment problems of the engine output shaft and the generator shaft, which misalignment can cause bearing wear and other maintenance problems.

6 Claims, 4 Drawing Figures

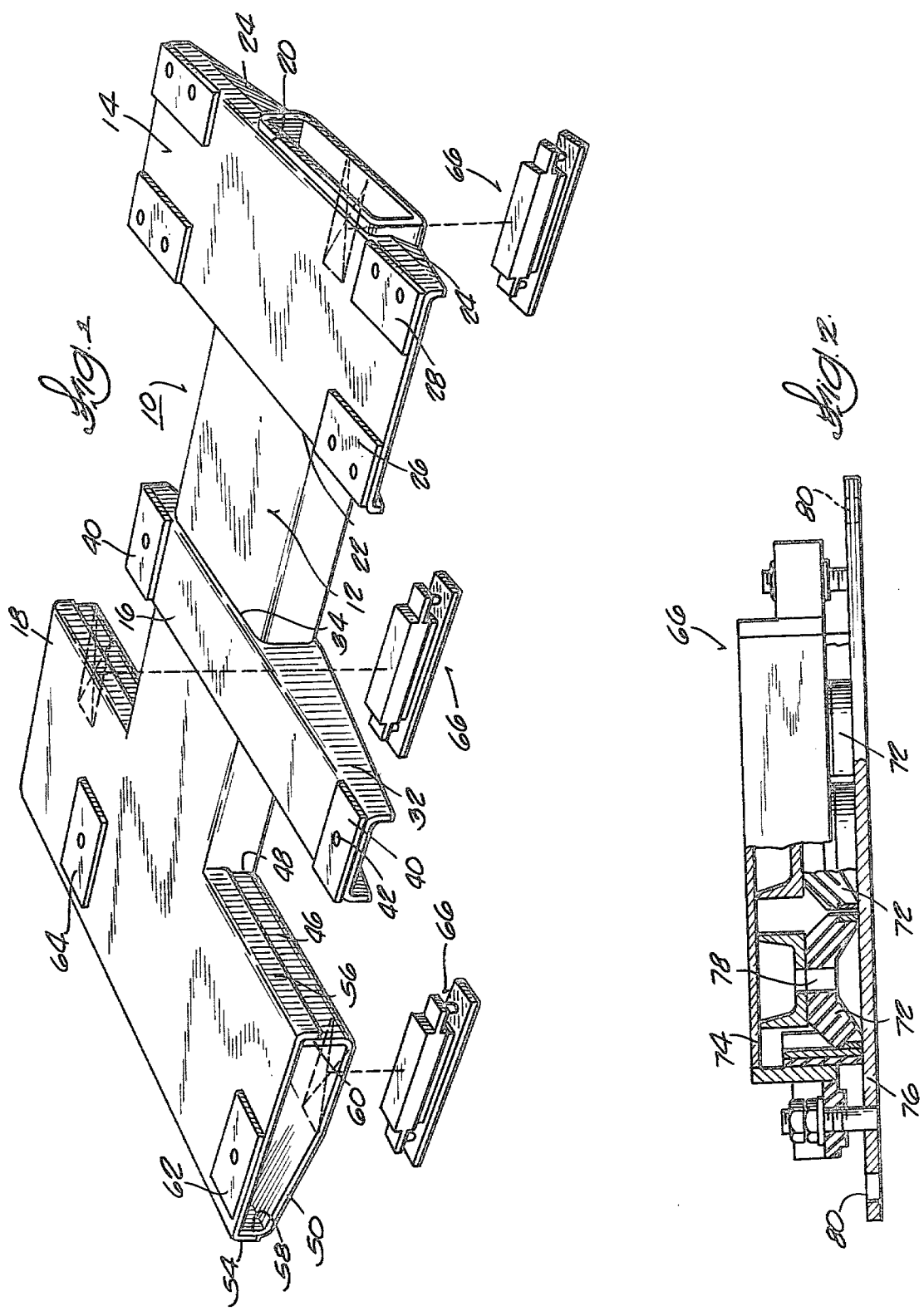

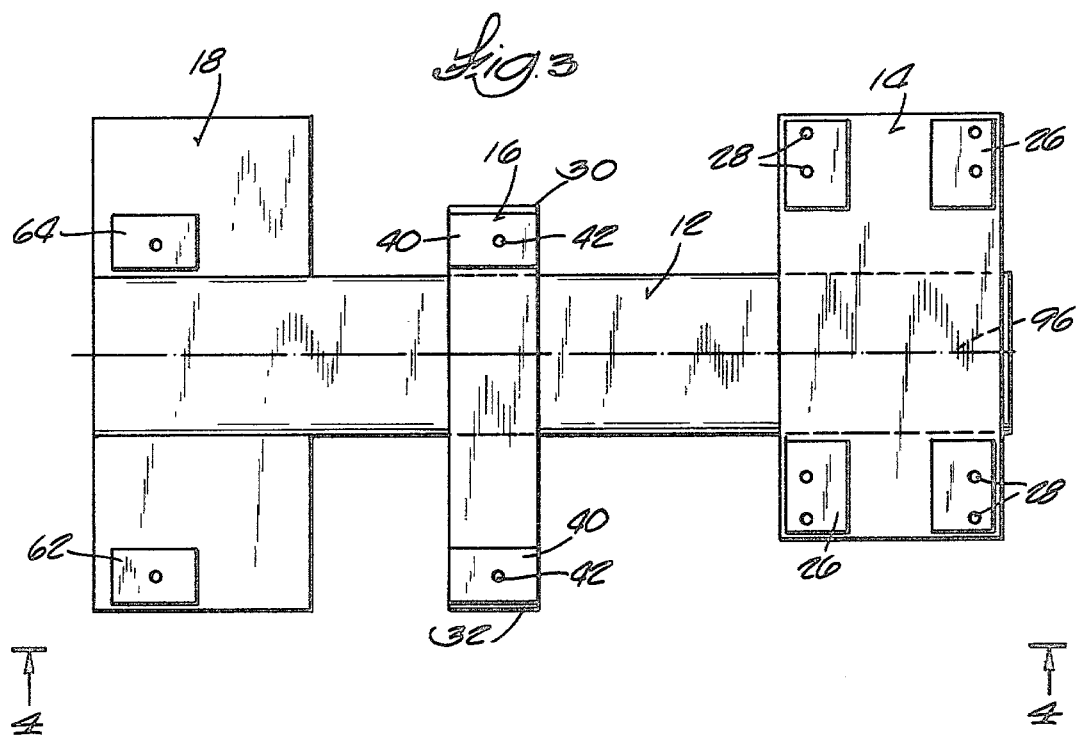
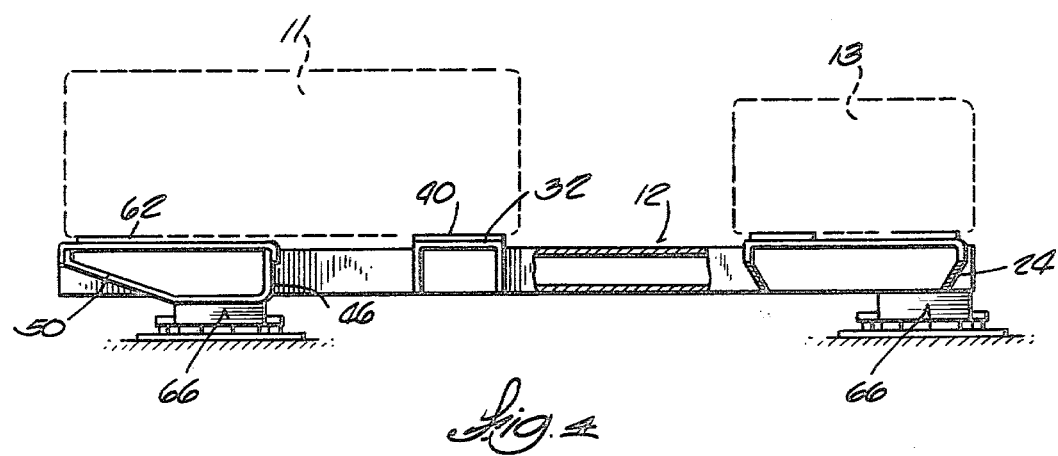

TURBINE SKID BASE

BACKGROUND OF THE INVENTION

Prior art skids for mounting turbine or engine-generator combinations typically are rectangular or round in shape and quite heavy. It has been discovered that securing a rectangular skid with a four point mounting, i.e. at the corners of the skid, can cause twisting of the skid or chassis and this can result in misalignment of the engine output shaft and the generator shaft. Misalignment of these shafts causes wear of the bearings and mounting components. The chassis disclosed herein is intended for use with relatively large engines or turbines in the range of 200 to 7,000 horsepower with generators up to 5,000,000 watts. However, chassis for components smaller or larger than these ranges can still obtain the benefits of the invention disclosed herein.

SUMMARY OF THE INVENTION

The invention provides a relatively light weight skeletonized chassis or skid which has sufficient strength and rigidity to minimize misalignment problems. Substantial weight is eliminated by the use of a central beam or backbone portion which is rectangular in cross-section. To accommodate the typical spacing of the turbine, or engine and generator mounting holes, laterally extending wing portions are connected to the beam, with mounting pads for this equipment located adjacent the ends of the wing portions. The wing portions are also constructed of channel material for strength and rigidity and are notched to interfit with the beam and are welded to the beam.

Problems with alignment and twisting of the chassis are minimized or eliminated by the use of a three point support of the chassis on the supporting surface, with three elongated mounting feet. The tripodal support thus provided insures positive and firm connection with the supporting surface irrespective of any irregularities of the planar characteristics of the floor. The mounting pads normally are bolted to the floor of the structure housing the engine-generator combination.

Further objects, advantages and features of the invention will become apparent from the disclosure.

DESCRIPTION OF THE DRAWINGS

FIG. 1 is a perspective view of the engine-generator chassis of the invention, with the mounting feet in spaced relation.

FIG. 2 is an enlarged fragmentary sectional view of a mounting foot illustrated in FIG. 1.

FIG. 3 is a plan view on somewhat reduced scale of the chassis shown in FIG. 1.

FIG. 4 is a view taken along lines 4—4 of FIG. 3.

DESCRIPTION OF THE PREFERRED EMBODIMENT

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

As illustrated in FIG. 1, the chassis 10 of the invention includes a central beam portion 12 which is constructed of steel and which is rectangular in cross-section with a relatively low profile or height compared to its width. The beam 12 spans the distance between the generator 11 and engine or turbine 13 to provide an integrated assembly when these components are mounted thereon. The engine and generator are bolted to first, second and third support sections, respectively, 14, 16 and 18, which are connected to the beam 12 and have portions extending laterally of the beam 12.

In the disclosed construction, the engine support 14 is formed from steel channel and is notched at 20 and 22 to interfit with the beam and provide adjoining flange or tapered gusset portions 24 which can be welded at the lines of contact with the beam 12. The engine support 14 is provided with engine mounting pads 26 which are welded to support 14 and are provided with bolt apertures 28 for connection of the engine. The shape of the engine mount 14 with the tapered gusset portions 24 facilitates ready access to the bolt holes for connection of the engine 13.

The generator support portion or member 16 is also formed from channel material and provided with two oppositely and laterally extending wing portions 30 and 32, with the member 16 notched at 34 to interfit with the beam. Mounting pads 40 are welded to the wing portions and provided with bolt apertures 42 for connection of the generator.

The generator support portion 18 includes a lower channel portion 46 which is notched at 48 to interfit with the under surface of the beam 12 and is provided with an upwardly converging portion 50 which minimizes the width of flanges 54 and 58 and hence the weight. The flanges 54 and 56 interfit with flanges 58 and 60 to form a box-like structure to provide good rigidity. The generator support portion 18 is also provided with two mounting pads 62 and 64.

The chassis is anchored to a supporting surface by three mounting feet 66 with two of the mounting feet 66 bolted to the wing portions of support portion 18 and the third foot 66 bolted to the beam 12 at 69. The mounting feet 66 are desirably in the form of rubber in shear type isolators typically employed as marine engine mounts. As illustrated in FIG. 2, such mounts have elastomeric members sandwiched between metal plates 74 and 76, with apertures 78 for securing the chassis and apertures 80 for fostering the feet to the floor.

The mounting apertures for the engine 13 and generator 11, which are connected by a coupling not shown, are aligned so that the center of torque or center of the twisting forces is coincident with the longitudinal center line 96 of the beam 12. This affords maximum rigidity and freedom of distortion.

Although a beam having a rectangular cross-section is preferred because it reduces the weight of the overall assembly for the same rigidity, a cylindrical beam could be employed to obtain some of the benefits of the invention.

What is claimed is:

1. In combination, an electrical generator and motor means for driving the generator, and a support for said generator and motor means, the improvement wherein said support comprises an elongated beam having a longituinal center line, first, second and third support sections connected transversely to said beam and having wing portions extending laterally on each side of said beam with respect to said longitudinal center line and said wing portions being cantilevered from said beam, said wing portions containing mounting pads adapted to be connected to the parts supported thereon, said mounting pads being spaced from said center line and located adjacent the ends of said wing portions.

2. The combination of claim 1 wherein said beam is generally rectangular in cross-section, with a longer horizontal transverse axis than vertical axis.

3. In combination, an electrical generator and motor means for driving the generator, and a support for said generator and motor means, the improvement wherein said support comprises an elongated beam, first, second and third support sections connected transversely to said beam and having wing portions extending laterally on each side of said beam, said wing portions containing mounting pads adapted to be connected to the parts supported thereon, with each of said first and second support sections containing two mounting pads to support one of said motor means and said generator and wherein said wing portions comprise downwardly open channel sections having notches to interfit and receive the upper surface and side surfaces of said beam, and said wing portions being welded to said top surface and said side surfaces.

4. The combination of claim 1 including three mounting feet to secure said support to a surface, two of said mounting feet being connected to said third support section and the other of said mounting feet being mounted under said beam portion generally on the longitudinal center line of said beam.

5. In combination, an electrical generator, motor means for driving the generator, and a skeletonized chassis for mounting said motor means and generator in a unitary assembly, said chassis comprising a relatively narrow beam section having a longitudinal center line with cantilevered wing portions extending laterally therefrom, said wing portions having mounting means for securing said generator and said motor means thereto, said mounting means being located at points on said wing portions spaced from said beam center line, and three resilient pads for anchoring said chassis on a supporting surface, two of said mounting pads being positioned on the under surface of said wing portions and spaced from said beam and said third pad being located generally on the longitudinal center line of said beam, and said motor means and said generator being positioned on said chassis so that the center of twisting force and torque is coincident with the center line of said beam.

6. The combination of claim 5 in which said beam is generally rectangular with upper and lower surfaces, with a width substantially greater than height to provide a low profile, and wherein at least one of said wing portions has upper and lower surfaces generally co-planar with said beam upper and lower surfaces.

* * * * *